(12) United States Patent
Wang

(10) Patent No.: US 12,502,200 B2
(45) Date of Patent: Dec. 23, 2025

(54) NEEDLE GROOVE PLATE, PUNCTURE SUPPORT, AND BIOPSY DEVICE

(71) Applicant: SUZHOU LEAPMED HEALTHCARE CORPORATION, Jiangsu (CN)

(72) Inventor: Qin Wang, Jiangsu (CN)

(73) Assignee: Suzhou Leapmed Healthcare Corporation (CN)

( * ) Notice: Subject to any disclaimer, the term of this patent is extended or adjusted under 35 U.S.C. 154(b) by 631 days.

(21) Appl. No.: 17/906,013

(22) PCT Filed: Mar. 11, 2020

(86) PCT No.: PCT/CN2020/078820
§ 371 (c)(1),
(2) Date: Sep. 9, 2022

(87) PCT Pub. No.: WO2021/179208
PCT Pub. Date: Sep. 16, 2021

(65) Prior Publication Data
US 2023/0123079 A1    Apr. 20, 2023

(51) Int. Cl.
*A61B 17/34* (2006.01)
*A61B 10/02* (2006.01)
*A61B 8/12* (2006.01)

(52) U.S. Cl.
CPC ...... *A61B 17/3403* (2013.01); *A61B 10/0241* (2013.01); *A61B 8/12* (2013.01);
(Continued)

(58) Field of Classification Search
CPC ................... A61B 17/3403; A61B 2017/3411
See application file for complete search history.

(56) References Cited

U.S. PATENT DOCUMENTS 4,489,730 A    12/1984   Jingu
6,475,152 B1   11/2002   Kelly, Jr. et al.
(Continued)

FOREIGN PATENT DOCUMENTS

CN    202619809 U    12/2012
CN    204971487 U    1/2016
(Continued)

OTHER PUBLICATIONS

EPO, Intention to Grant, Application No. 20923875.7 filed Mar. 11, 2020, Apr. 11, 2025. Whole Document.
(Continued)

*Primary Examiner* — Daniel L Cerioni
(74) *Attorney, Agent, or Firm* — Sisson & Banyas, Attorneys at Law, LLC; Jeffrey Banyas

(57) ABSTRACT

A needle groove plate (5), a puncture support (100) and a biopsy device are disclosed. The puncture support (100) includes a main body (1), a rod (4), and a needle groove plate (5), wherein the main body (1) can be connected to an ultrasonic probe (200) and is provided with a channel (13), and the length of the channel (13) is less than the length of the rod (4); the rod (4) can from a first end thereof go into the channel (13) and slide back and forth in the channel (13) along a first direction, the first direction being parallel to an extending direction of the rod (4); and the needle groove plate (5) is fixed to a second end of the rod (4), and is provided with at least one needle penetration hole (513) parallel to the first direction.

15 Claims, 14 Drawing Sheets

(52) U.S. Cl.
CPC ............... *A61B 2017/3411* (2013.01); *A61B 2017/3413* (2013.01)

(56) References Cited

U.S. PATENT DOCUMENTS

| | | | |
|---|---|---|---|
| 2011/0190793 A1* | 8/2011 | Nobles | A61B 17/0469 606/144 |
| 2017/0245798 A1* | 8/2017 | Ohkoshi | A61B 5/14532 |
| 2019/0231386 A1 | 8/2019 | Allaway | |
| 2020/0237390 A1* | 7/2020 | Mao | A61B 17/0293 |

FOREIGN PATENT DOCUMENTS

| | | |
|---|---|---|
| CN | 105902301 A | 8/2016 |
| CN | 206151551 U | 5/2017 |
| CN | 206995315 U | 2/2018 |
| CN | 208677522 U | 4/2019 |
| CN | 208942304 U | 6/2019 |
| JP | 4550531 B2 | 9/2010 |
| WO | 9610958 A2 | 4/1996 |
| WO | 2019057833 A1 | 3/2019 |

OTHER PUBLICATIONS

EPO, Intention to Grant Claims, Application No. 20923875.7 filed Mar. 11, 2020, Apr. 11, 2025. Whole Document.
Curell Suñol, Amended Claims with Annotations, Application No. 20923875.7 filed Mar. 11, 2020, May 13, 2024. Whole Document.

* cited by examiner

NEEDLE GROOVE PLATE, PUNCTURE SUPPORT, AND BIOPSY DEVICE

TECHNICAL FIELD

The present invention relates to the technical field of medical supplies, in particular to a needle groove plate, a puncture support and a biopsy device.

BACKGROUND ART

As people's way of living has changed in recent years, prostate disease in men is in the trend of rising, which seriously threatens people's health and quality of life. Prostate disease is a common disease especially among older men.

At present, generally prostate biopsy is used to detect and troubleshoot prostate diseases. In ultrasound biopsy, a small amount of sample tissues needs to be taken out from different parts of the prostate for the purpose of diagnosis. Biopsy is less invasive and more accurate, and thus has been widely used in clinic applications. Common sampling ways of biopsy are by way of rectum and by way of perineum. There are some disadvantages by way of rectum, which are mainly as follows: 1. an ultrasound probe and a puncture support reach the position of the prostate via the rectum entrance, and bacteria in the rectum easily lead to a high risk of being infected; and, 2. puncture positions are limited and there are some blind areas. Therefore, biopsy by way of perineum is the mainstream method of prostate biopsy at present, and has advantages of aseptic operations, low risk of being infected and comprehensive sampling.

The existing needle groove plate is a square grid screen plate, on which hundreds of needle penetration holes are arranged in an array. The needle groove plate is fixedly mounted on the puncture support by a dedicated stepper. When in use, the stepper is adjusted to make the puncture support of the grid screen plate abut against a patient's perineum. The ultrasonic probe connected to the puncture support goes from the patient's anus into the prostate position, and selects an appropriate hole position of the grid screen plate to insert the needle. After the puncture needle is inserted into the patient's perineum, it reaches the position in the prostate that needs to be punctured. There are hundreds of positions into which needles can be inserted on this type of grid screen plate, which can fully cover any position where the prostate needs to be punctured without blind areas. However, there are still the following disadvantages: 1. the grid screen plate requires a particular stepper for fixation, but the stepper is expensive, and its size could easily interfering the doctor's surgical operations, besides, a large area has a higher risk of being contaminated; and, 2. holes in the grid screen plate are closed holes, sometimes the doctor needs to separately remove the ultrasonic probe and the puncture support during surgery, leaving only the puncture needle in the human body. In this case, since the holes in the grid screen plate are closed holes, the grid screen plate could not separate the needle and the support, and thus the need for separating cannot be satisfied.

SUMMARY OF THE INVENTION

In view of the above, the present invention provides a needle groove plate, a puncture support and a biopsy device, which have advantages of a simple structure, low costs, flexible and convenient operations, and capability of achieving separation of the penetration needle in surgery.

According to one aspect of the present invention, a needle groove plate is provided, whirl includes a needle groove arm and a clamping component, wherein: the needle groove arm is provided with a plurality of parallel needle penetration holes arranged along the vertical direction of the needle groove arm and penetrating the needle groove arm along the horizontal direction of the needle groove arm; and the clamping component is located at the bottom of the needle groove arm for connecting a puncture support.

Optionally, on side walls of the needle groove arm, a plurality of beams is provided in parallel along the vertical direction of the needle groove arm, and the needle penetration holes are voids between the plurality of beams.

Optionally, the width of an entrance into the needle penetration holes from a radial direction of the needle penetration holes is smaller than an inner diameter of the needle penetration holes.

Optionally, the needle penetration holes have an intact inner wall.

Optionally, the needle groove arm includes a main body portion and a cooperating portion, wherein: an abutting surface of the cooperating portion is provided with a plurality of parallel grooves that are arranged along the vertical direction of the needle groove arm and penetrate the needle groove arm along the horizontal direction of the needle groove arm; and an abutting surface of the main body portion fits the abutting surface of the cooperating portion to form a hole having an intact inner wall.

Optionally, the main body portion and the cooperating portion are connected by a connecting component; the connecting component includes a hole located in the top of the main body portion and a buckle located in the top of the cooperating portion, the buckle includes a first board perpendicular to the abutting surface of the cooperating portion, a free end of the first board is connected with a second board arranged in parallel with the first board, the first board and the second board form a U-shaped structure, a free end of the second board extends and protrudes out of a surface of the cooperating portion, the said surface is a plane that located away from the abutting surface, an upper surface of the second board is provided with a protruding structure that has a fourth inclined surface and a fourth straight end surface; and/or, the bottom of the main body portion is provided with an abutting platform that abuts against the bottom of the cooperating portion, the abutting platform is provided with a groove, and the bottom of the cooperating portion is provided with a protrusion to be inserted into the groove.

Optionally, the clamping component includes a protruding structure and two insertion arms, wherein: the two insertion arms are provided along the horizontal direction of the needle groove arm, specifically at an edge of the bottom of the needle groove arm; and the protruding structure is provided in the bottom of the needle groove arm and is located between the two insertion arms, and the protruding structure includes a third inclined surface and a third straight end surface.

Optionally, one end of the insertion arms has an insertion end, and the other end is a position limit end, the position limed end is provided with a protruding stop block along a surface of the insertion arms.

According to another aspect of the present invention, a puncture support is further provided, which includes a main body, a rod, and the needle groove plate, wherein: the main body is connectable to an ultrasonic probe and has a channel whose length is smaller than the length of the rod; the rod can, from a first end thereof, go into the channel, and slide back and forth in the channel along a first direction that is parallel to an extending direction of the rod; and the needle groove plate is fixed to a second end of the rod.

Optionally, the main body includes a hold hoop and two L-shaped walls with a spacing; the hold hoop is used to connect the ultrasonic probe; and the L-shaped walls include vertical walls and horizontal walls, wherein the vertical walls extend from an outer surface of the hold hoop towards the direction away from the hold hoop, two horizontal walls respectively extend from free sides of two vertical walls towards each other, and the free sides are parallel to the first direction, so that the two L-shaped walls and an outer wall of the hold hoop form the channel.

Optionally, the hold hoop includes a hold hoop main body having an arch-shaped cross section and an arch-shaped wrench connected with the hold hoop main body, and the L-shaped walls are located on the hold hoop main body; and one end of the wrench is connected right next to one edge of the hold hoop main body; and a first stepped edge is located next to the other edge of the hold hoop main body, the other end of the wrench is provided with a second stepped edge for clamping the first stepped edge so that the hold hoop main body and the wrench forma closed loop.

Optionally, an upper surface of a main arm of the rod includes an upper boss that protrudes upwards so as to be located between the two horizontal walls and extend along the first direction; and a plurality of pits are arranged in one line along surfaces of two side walls of the upper boss along the first direction; the two horizontal walls have notches at the same positions in the first direction; the puncture support further has a push button and two first elastic arms, wherein: a fixed end of the first elastic arms is fixed to an inner wall at an entrance of the notches, and the first elastic arms are parallel to the first direction, so that the first elastic arms and the notches form a hole, and free ends of the two first elastic arms are provided with convex points, and two convex points protrude towards each other; the push button includes a push button platform and two fixed arms, the fixed arms are located on a lower surface of the push button platform and are perpendicular to the push button platform, the fixed arms are inserted into the hole and can slide in the hole along the first direction, roots of the fixed arms have a first section of fixed arms protruding towards the entrance of the notches, the first section of fixed arms is used for abutting against the free ends of the first elastic arms so that the convex points get into the pits and thereafter cannot be separated therefrom, thereby limiting the rod sliding in the channel along the first direction.

Optionally, the first section of fixed arms is provided with a second section of fixed arms extending towards the direction away from the push button platform, a U-shaped groove parallel to the first direction is formed between the second section of fixed arms and the first section of fixed arms, and part of edges of both sides of the main arm are located in the U-shaped groove; and an upper surface of the push button platform is provided with a hand position slot and/or an identification portion.

Optionally, a lower portion of the rod has a groove extending along the first direction, and an accommodating space is formed between the groove and an outer wall of the hold hoop; a wall of the hold hoop is provided with a single hole in which a second elastic arm is provided, the single hole is located on the wall of the hold hoop in the channel and close to one end of the channel away from the needle groove plate; and the second elastic arm is parallel to the first direction, a fixed end of the second elastic arm is fixed to an end surface of the wall of the hold hoop, and a free end of the second elastic arm is provided with a protruding structure that includes a first straight end surface whose height is greater than a wall thickness of the hold hoop, so that the protruding structure protrudes towards the interior of the channel and goes into the accommodating space; and the first end of the rod has an end wall perpendicular to the first direction, and an inner side of the end wall can be blocked by the first straight end surface during the sliding process of the rod so as to stop sliding.

Optionally, a front end of the main arm is provided with two auxiliary arms in parallel extending along the first direction, a defined spacing is provided between the two auxiliary arms, and inner sides of the two auxiliary arms are each provided with protruding blocking walls protruding towards each other; a lower surface of the main arm is provided with a lower boss provided along a length direction thereof, a surface of the lower boss fits an outer wall of the hold hoop, the lower boss extends to below a lower portion of the auxiliary arms, the bottom of one end of the two auxiliary arms away from the main arm is connected to the beams, a third elastic arm arranged along a sliding direction of the rod is provided between the two auxiliary arms, both ends of the third elastic arm are respectively connected with an end portion of the main arm and the beams, and an upper surface of the third elastic arm is provided with a protruding structure that includes a second inclined surface and a second straight end surface; insertion arms are inserted between the two auxiliary arms, an upper surface of the insertion arms fits a lower surface of the blocking wall, positions of the second inclined surface and the second straight end surface, and the third inclined surface and the third straight end surface are so set that the second straight end surface abuts against the third straight end surface, and thus the insertion arms cannot exit from between the two auxiliary arms.

Optionally, both ends of the beams respectively protrude towards directions of both sides of the first direction so as to abut against an end surface of a second end of the hold hoop close to the rod to form a limit position.

According to a further aspect of the present invention, a biopsy device is further provided, which includes an ultrasonic probe and the puncture support, wherein the hold hoop of the puncture support is sleeved on an outer wall of the ultrasonic probe.

Optionally, the outer wall of the ultrasonic probe is provided with a position limit protrusion, and the hold hoop is provided with a slot for clamping the position limit protrusion.

According to the technical solution provided by the present invention, the existing square puncture support is replaced with the needle groove plate, and the needle groove plate is in a clamping connection with the puncture support without a need for a stepper structure, which not only optimizes the structure of the puncture support and reduces its volume, but also reduces manufacturing costs. Meanwhile, the needle penetration hole can adopt a groove shaped non-closed hole, so that the penetration needle can be separated from the puncture support and the ultrasonic probe during surgery, thereby facilitating flexible operations by the doctor.

BRIEF DESCRIPTION OF THE DRAWINGS

The present invention will be described with reference to preferred embodiments of the present invention, particularly figures, for the purpose of illustrations rather than limitations, wherein.

In the figures.

1. main body; 2. wrench; 3. push button; 4. rod; 5. needle groove plate; 6. rubber pad; 11. hold hoop; 12. L-shaped wall; 13. channel; 111. first stepped edge; 112. rotary shaft; 113. slot; 120. hole; 121. first elastic wall; 122. notches; 123. vertical walls; 124. horizontal walls; 1211. convex points; 130. protruding structure; 131. second elastic wall; 132. first inclined surface; 133. first straight end surface; 134. single hole;

21. rotary sleeve; 22. arch-shaped portion; 23. second stepped edge; 24. hand position; 31. push button platform; 32. fixed arm; 311. hand position slot; 321. first section of fixed arms; 322. U-shaped groove; 323. second section of fixed arms;

41. main arm; 42. upper boss; 43. lower boss; 44. third elastic arm; 45. beam; 46. end wall; 47. groove; 411. auxiliary arms; 421. pits; 440. protruding structure; 441. second inclined surface; 442. second straight end surface; 461. inner side of end arm; 4111. blocking arm;

51. needle groove arm; 52. insertion arms; 53. main body portion; 54. cooperating portion; 511. depth identifier; 512. specification identifier; 513. needle penetration hole; 520. protruding structure; 521. third inclined surface; 522. third straight end surface; 531. hole; 532. abutting platform; 533. groove; 541. buckle; 542. protruding structure; 543. protrusion; 5411. first board; 5412. second board; 5413. handle; 5421. fourth inclined surface; 5422. fourth straight end surface; 5131. groove;

100. puncture support; 200. ultrasonic probe.

DETAILED DESCRIPTION

In embodiments of the present invention, the structure of a puncture support is effectively optimized, which can not only reduce its sizes and costs, but also facilitate flexible operations by a doctor and reduce a patient's discomfort in use. It will be described below in detail.

Figure 1:
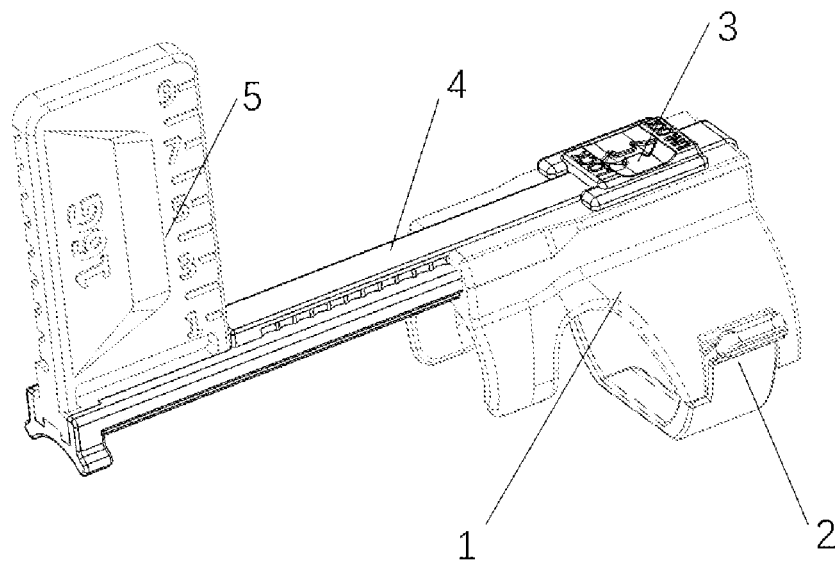
FIG. 1 is a structural schematic diagram of a puncture support according to an embodiment of the present invention.

FIG. 1 is a structural schematic diagram of a puncture support according to an embodiment of the present invention. As shown in FIG. 1, the puncture support according to the present invention includes a main body 1, a wrench 2, a push button 3, a rod 4 and a needle groove plate 5, wherein the main body 1 and the wrench 2 are used to connect an ultrasonic probe, a first end of the rod 4 is inserted into the main body 1, a second end of the rod 4 is connected with the needle groove plate 5, the rod 4 can slide back and forth along an extending direction thereof (the left-right direction according to the perspective in the figure, and the sliding direction will be called "a first direction" below), and the push button 3 can lock the rod 4 during the sliding process. The structure of the puncture support will be further described below.

Figure 2:
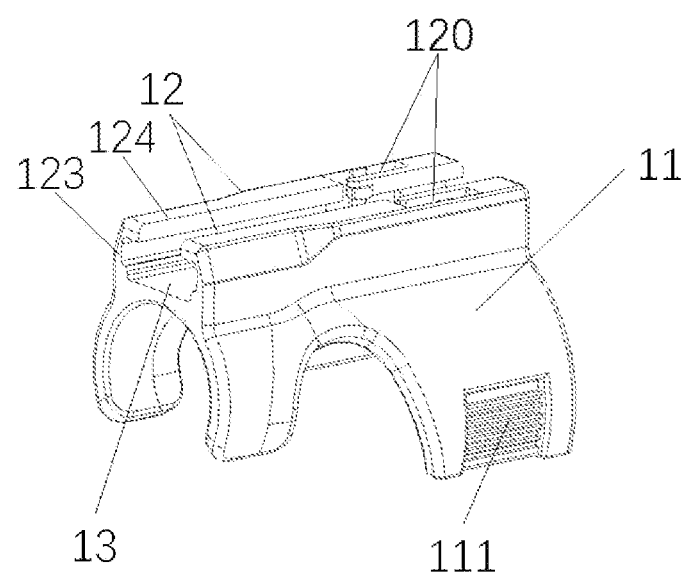
FIG. 2 is a structural schematic diagram of a main body.

FIG. 2 is a structural schematic diagram of the main body. As shown in FIG. 2, the main body 1 includes a hold hoop 11 and two L-shaped walls 12 with a spacing in between; the hold hoop 11 is used to connect the ultrasonic probe; and the L-shaped walls 12 include vertical walls 123 and horizontal walls 124, wherein the vertical walls 123 extend from an outer surface of the hold hoop 11 towards the direction (an upward direction according to the perspective in the figure) away from the hold hoop 11, two horizontal walls 124 respectively extend from free sides of two vertical walls 123 towards each other, and the free sides are parallel to the first direction, so that the two L-shaped walk 12 and an outer wall of the hold hoop 11 form the channel 13.

Figure 3:
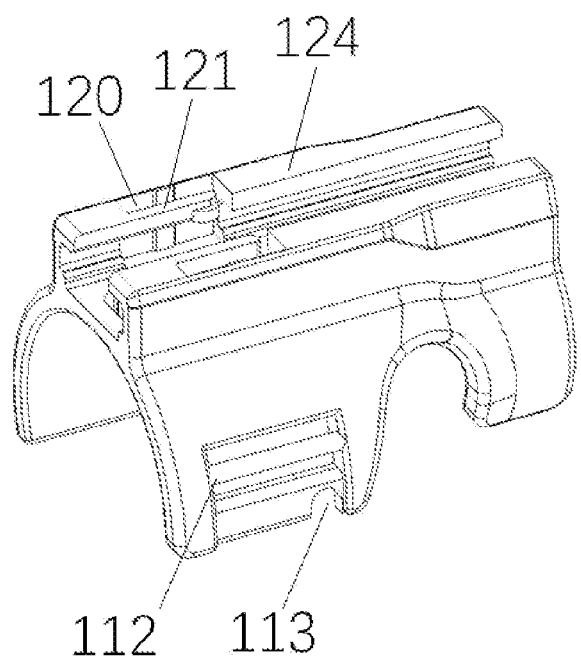
FIG. 3 is a structural schematic diagram of another perspective of the main body.

FIG. 3 is a structural schematic diagram of the main body from another perspective. As shown in FIGS. 2 and 3, according to the perspective in the figures, the L-shaped walls 12 are provided above a hold hoop main body of the hold hoop 11, and one side of the hold hoop main body is provided with a first stepped edge 111 (shown in FIG. 2), and the other side thereof is provided with a rotary shaft 112 (shown in FIG. 3).

Figure 4:
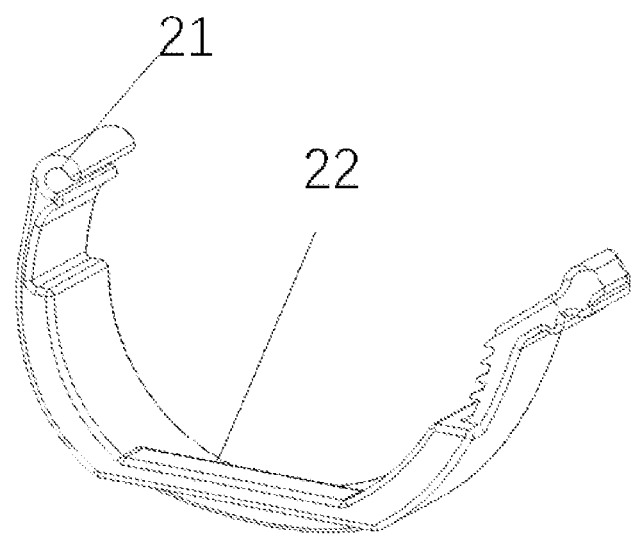
FIG. 4 is a structural schematic diagram of a wrench.
Figure 5:
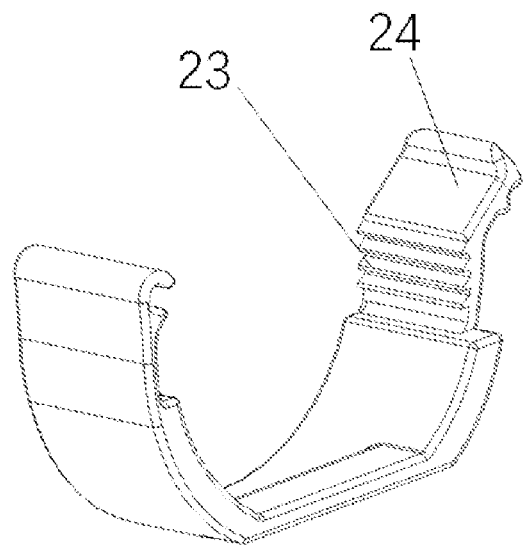
FIG. 5 is a structural schematic diagram of another perspective of the wrench.

The hold hoop 11 further includes a wrench 2 used to connect the hold hoop main body; FIG. 4 is a structural schematic diagram of the wrench; FIG. 5 is a structural schematic diagram of the wrench from another perspective; as shown in FIGS. 4 and 5, the main body of the wrench is an arch-shaped portion 22 that has a certain elastic deformation capability. One end of the arch-shaped portion 22 is provided with a rotary sleeve 21, and the other end of the arch-shaped portion 22 is provided with a second stepped edge 23 for clamping the first stepped edge 111, wherein, a hand position 24 is further provided at the second stepped edge 23.

The rotary sleeve 21 is a cylinder provided with an opening whose width is smaller than an inner diameter of the cylinder, and the rotary sleeve 21 has a certain elastic deformation capability to make the width of the opening varies, and further make the rotary sleeve 21 capable of clamping a connecting shaft 112, so that the wrench 2 is rotatable about the rotary shaft 112 within a certain range. The first stepped edge 111 can occlude with the second stepped edge 23 provided on the wrench 2, the inclination directions of the steps of the first stepped edge and the second stepped edge make the two only movable towards each other in the direction of reducing the inner diameter of the hold hoop in the contact state. If the inner diameter of the hold hoop needs to be increased, the other end of the wrench 2 needs to be pulled, so that the first stepped edge 111 is separated from the second stepped edge 23. In this way, after the puncture support is sleeved on the ultrasonic probe, it is only required to hold the hold hoop at the thumb-index web of an operator's hand and then apply a force to tighten up the hold hoop. Thus it is easy to control the size of the hold hoop 11 thus formed, and the hold hoop 11 cannot automatically relax after being tightened up. In addition, multi-step stepped edges make the hold hoop suitable for various diameters of the puncture support, thereby improving applicability of the puncture support.

As shown in FIGS. 2-5 and the above depictions, there is a split structure between the hold hoop main body and the wrench 2, and the ultrasonic probe is held closely by starting or closing of the wrench 2. in addition, the hold hoop main body and the wrench 2 can also be set as an integral structure. That is, the hold hoop main body and the wrench 2 enclose a closed loop with a constant inner diameter, friction between an inner surface of the hold hoop and an outer surface of the ultrasonic probe is used to sleeve the closed-loop structure on the ultrasonic probe when the puncture support is connected with the ultrasonic probe.

Figure 6:
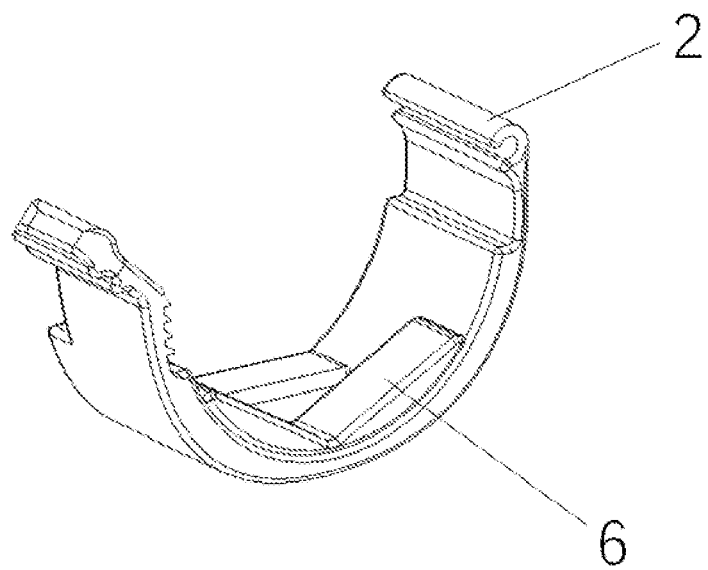
FIG. 6 is a structural schematic diagram of adding a rubber pad to the wrench.

FIG. 6 is a structural schematic diagram of adding a rubber pad to the wrench. As shown in FIG. 6, a rubber pad 6 is provided on an inner wall of the arch-shaped portion 22 along its radian direction, the soft rubber pad 6 is made of soft materials such as rubber, TPE or TPU, and is fixedly connected, e.g., bonded, to the arch-shaped portion 22. By setting the structure of the rubber pad 6, the puncture support can be assembled better, and friction between the puncture support and the ultrasonic probe can be increased, thereby facilitating a stabler assembling. Besides, since the rubber pad 6 is of an elastomer material, the ultrasonic probe can be protected from being scratched and damaged when the puncture support is mounted and dismounted.

Figure 7:
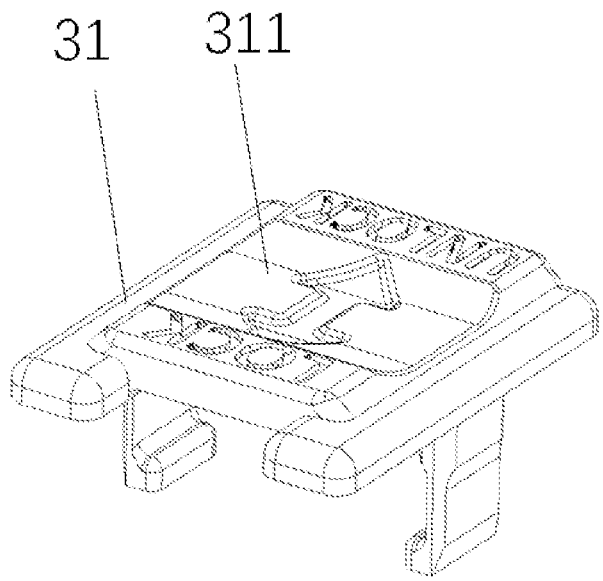
FIG. 7 is a structural schematic diagram of a push button.
Figure 8:
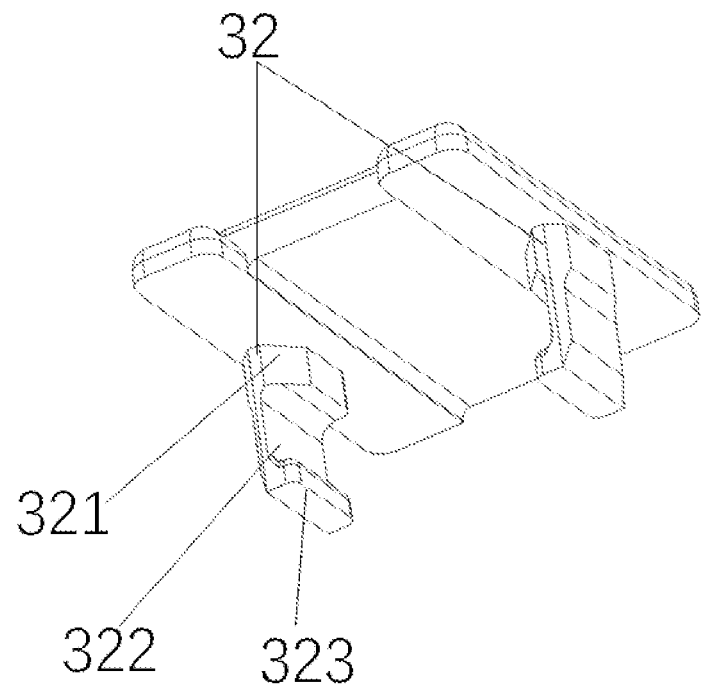
FIG. 8 is a structural schematic diagram of another perspective of the push button.

FIG. 7 is a structural schematic diagram of the push button, and 8 is a structural schematic diagram of the push button from another perspective. As shown in FIGS. 7 and 8, the push button 3 includes a push button platform 31 and two fixed arms 32 located on the lower surface of the push button platform 31 and perpendicular to the push button platform 31. The upper surface of the push button platform 31 is provided with a hand position slot 311 and/or an identification portion. The hand position slot 311 can increase friction between figures and the hand position slot 311 during in use, and the identification portion is character and/or pattern information to facilitate the user to know about functions and operation method of the push button 3.

Figure 9:
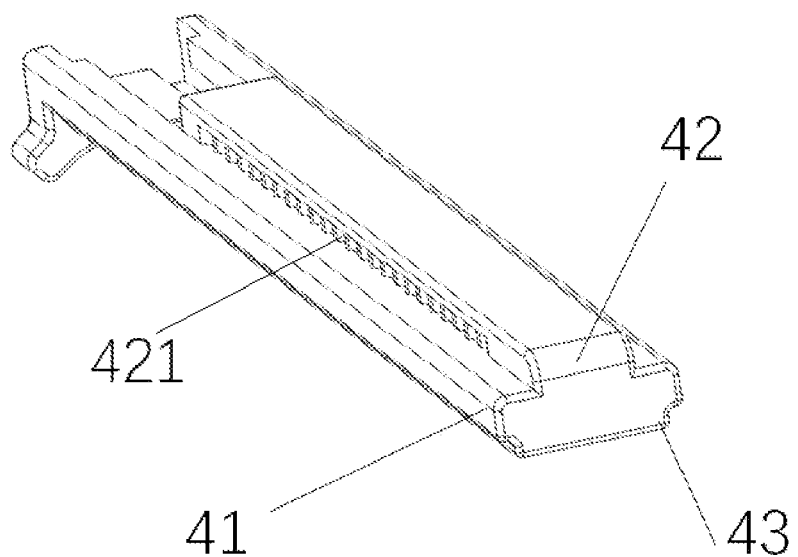
FIG. 9 is a structural schematic diagram of a rod.

FIG. 9 is a structural schematic diagram of the rod. As shown in FIG. 9, the rod 4 includes a main arm 41, an upper boss 42 provided above the main arm 41, and a lower boss 43 provide below the main arm 41. The upper boss 42 and the lower boss 43 extend along the length direction of the main arm 41, and the three are an integral structure. That is, the shape of the cross section of the rod 4 is similar to the "+" character. The rod 4 can, from its first end (a proximal end according to the perspective of FIG. 9) go into a channel 13, the length of the channel 13 is less than the length of the rod 4, so that after the rod 4 goes into the channel 13, part of the rod 4 is located outside the channel 13 and a needle groove plate can be mounted. The rod 4 can slide back and forth in the channel 13 along the first direction. In this state, the upper boss 42 is located between two horizontal walls 124, and the surface of the lower boss 43 fits the outer wall of the hold hoop 11.

Figure 10:
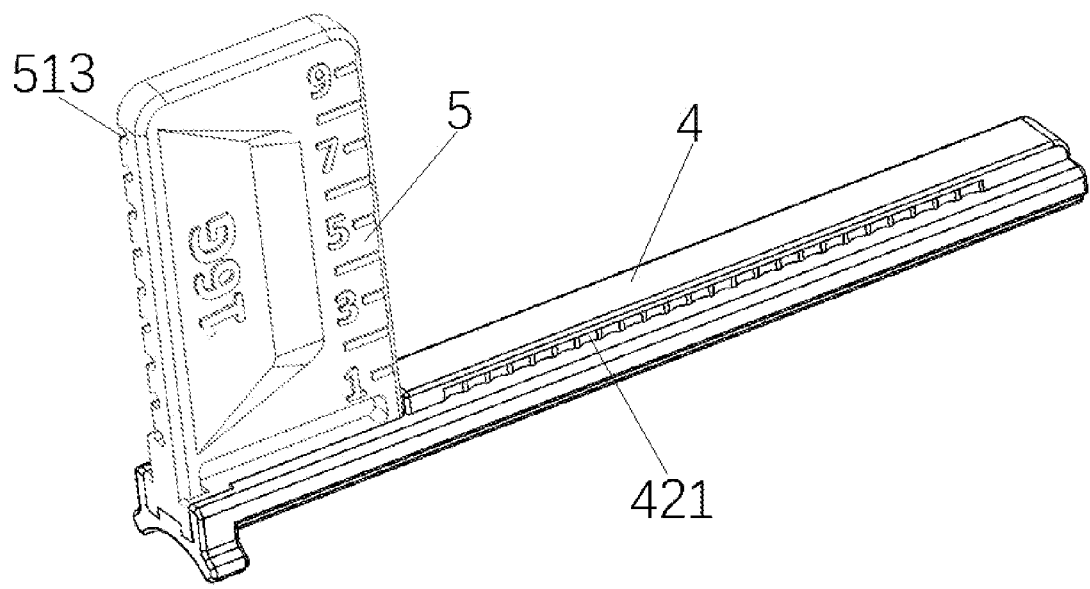
FIG. 10 is a structural schematic diagram of the rod being connected with a needle groove plate.

FIG. 10 is a structural schematic diagram of the rod being connected with the needle groove plate. As shown in FIG. 10, the needle groove plate 5 is fixed to the second end of the rod 4 (i.e., a distal end in FIG. 9), and the needle groove plate 5 is provided with at least one needle penetration hole 513 parallel to the first direction. The structure of the needle groove plate will be described below.

Figure 11:
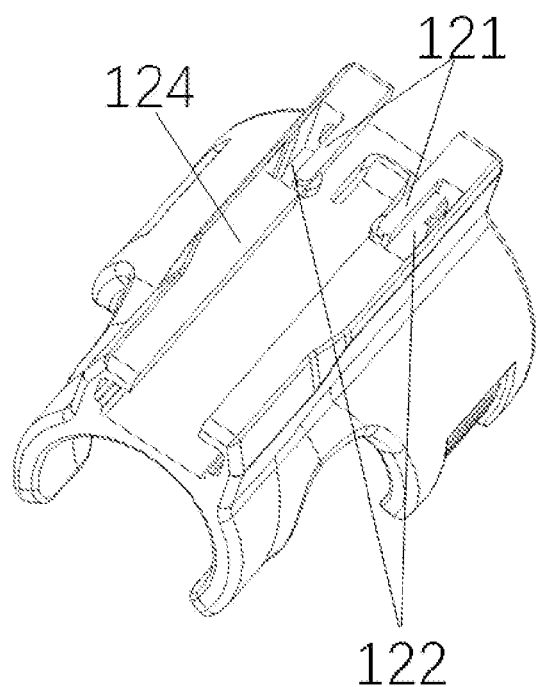
FIG. 11 is a structural schematic diagram of the top of the main body.
Figure 12:
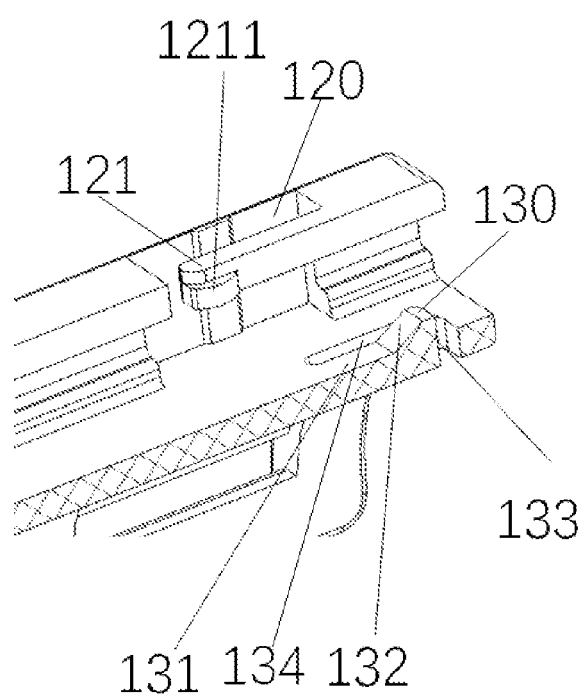
FIG. 12 is a sectional view of a first elastic arm along a first direction.

In embodiments of the present invention, the push button 3 can be used to lock the rod 4 so as to limit expansion position of the rod 4 on the main body 1 and achieve the purpose of adjusting the position of the needle groove plate 5. As shown in FIGS. 9 and 10, a plurality of pits 421 are arranged in one line along surfaces of two side walls of the upper boss 42 along the first direction. FIG. 11 is a structural schematic diagram of the top of the main body. FIG. 12 is a sectional view of the first elastic arm along the first direction. As shown in FIGS. 2, 3, 11 and 12, the two horizontal walls 124 have notches 122 in the same positions in the first direction, the fixed end of the first elastic arm 121 is fixed to the inner wall at the entrance of the notches 122, and the first elastic arm 121 is parallel to the first direction, so that the first elastic arm 121 and the notches 122 form the hole 120. Free ends of two first elastic arms 121 are provided with convex points 1211, and two convex points 1211 protrude towards each other. When the push button 3 is connected with the main body 1, the fixed arms 32 are inserted into the hole 120 and can slide in the hole 120 along the first direction, roots of the fixed arms 32 have a first section 321 of fixed arms protruding towards the entrance of the notches 122, the first section 321 of fixed arms abuts against the first elastic arms 121 when the first section 321 of fixed arms is located at the free ends of the first elastic arms 121, then the first section of fixed arms 321 can limit the opening of the free ends of the first elastic arms 121 so that the convex points 1211 cannot be separated from the pits 421 and the first elastic arms 121 lock tightly the rod 4 to achieve the purpose of limiting free sliding of the rod 4 along the first direction. When the first section 321 of fixed aims slides to the other end of the first elastic arms 121 (away from the free end), the free end of the first elastic arms 121 breaks away from limitation of the first section 321 of fixed arms, then the rod 4 is manually pulled, the convex points 1211 can break away from the pits 421 under the action of external force, and if continuing to apply a pulling force to the rod 4, the convex points 1211 repeat acts of getting into the pits 421 and breaking away from the pits 421 until the rod 4 moves to a target position. At that time, the convex points 1211 get into the pits 421, the first section 321 of fixed arms is moved to the free end of the first elastic arms 121, and the first section 321 of fixed arms locks tightly the rod 4 again to complete adjustments of the position of the rod 4.

As shown in FIG. 8, the first section 321 of fixed arms is provided with a second section 323 of fixed arms extending towards a direction away from the push button platform 31, a U-shaped groove 322 parallel to the first direction is formed between the second section 323 of fixed arms and the first section 321 of fixed arm, and in the state shown in FIG. 1, part of edges of both sides of the main arm 41 are located in the U-shaped groove 322.

Figure 13:
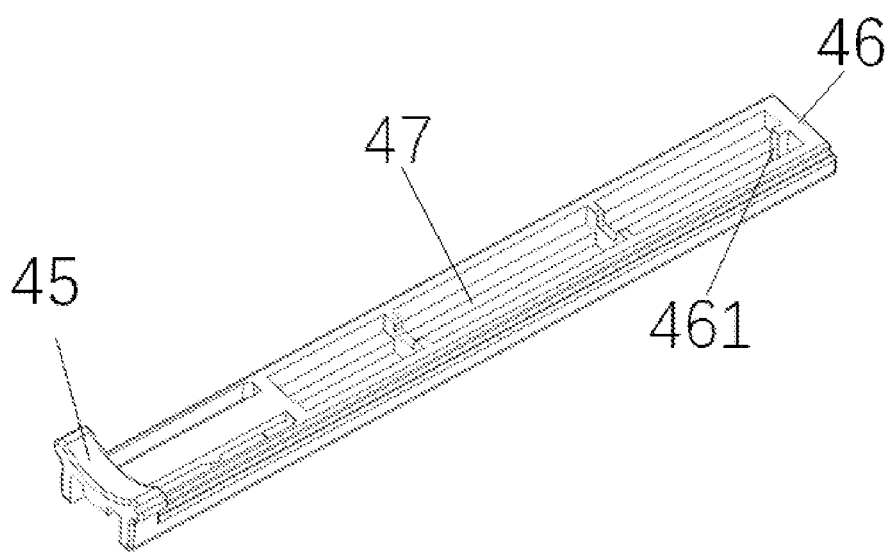
FIG. 13 is a structural schematic diagram of a lower surface of the rod.

In embodiments of the present invention, when the push button 3 is in an unlocked state, the rod 4 can freely slide in the channel 13 of the main body 1. In order to prevent the rod 4 from being separated from the main body 1, a position limit structure is further provided therebetween. FIG. 13 is a structural schematic diagram of the lower surface of the rod (according to the perspective of FIG. 1). As shown in FIG. 13, there is a groove 47 extending along the first direction below the rod 4 (in FIG. 13, the rod 4 is in a flip state that the lower surface is placed upwards), the groove 47 can form an accommodation space with the outer wall of the hold hoop 11. As shown in FIG. 12, the wall of the hold hoop 11 is provided with a single hole 134, and a second elastic arm 131 is provided in the single hole 134. The second elastic arm 131 has a certain elastic deformation capability, and the single hole 134 is located on the wall of the hold hoop 11 in the channel 13 and close to one end of the channel 13 away from the needle groove plate 5 (see FIG. 1). The second elastic arm 131 is parallel to the first direction, the fixed end of the second elastic arm 131 is fixed to the end surface of the wall of the hold hoop 11 and the free end of the second elastic arm 131 is provided with a protruding structure 130, and the protruding structure 130 includes a first straight end surface 133 and a first inclined surface 132 whose height is greater than a wall thickness of the hold hoop 11, so that the protruding structure 130 protrudes towards the interior of the channel 13 and goes into the accommodating space formed between the groove 47 and the outer wall of the hold hoop 11. As shown in Fig, 13, the first end of the rod 4 has an end wall 46 perpendicular to the first direction. Referring to FIG. 11, when the rod 4 slides in the channel 13 towards the outer side of the end wall 46 in the upper right of FIG. 11 during an inserting sliding process, the rod 4 passes the first inclined surface 132, then an inner side 461 is blocked by the first straight end surface 133 from the retracting sliding process of the rod 4 in the channel 13 in the lower left of FIG. 11 thus lock the rod 4 in place, so the rod 4 cannot exit from the channel 13. In addition, the protruding structure 130 is enclosed in the accommodating space so that the rod 4 cannot be easily disassembled from the channel 13, which facilitates realizing disposable use of the puncture support and improving sanitation and safety.

Figure 14:
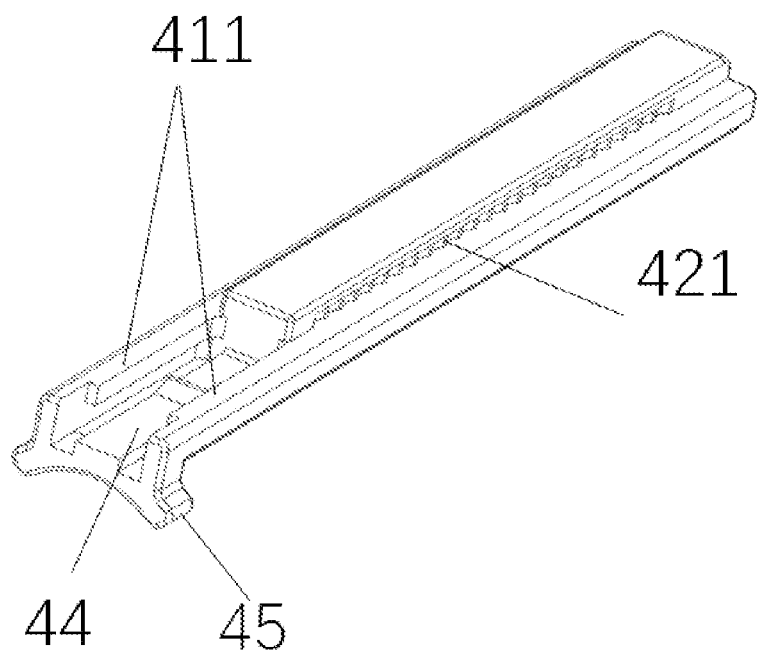
FIG. 14 is a structural schematic diagram of another perspective of the rod.
Figure 15:
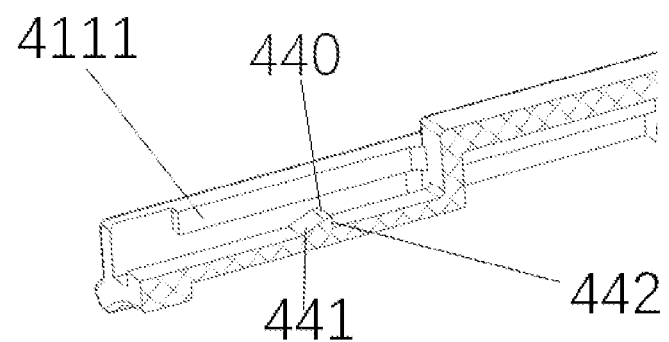
FIG. 15 is a sectional view of a front end of the rod.

In embodiments of the present invention, the needle groove plate 5 is in a clamping connection with the second end of the rod 4. FIG. 14 is a structural schematic diagram of another perspective of the rod. FIG. 15 is a sectional view of the front end of the rod. As shown in FIGS. 14 and 15, the front end of the main arm 41 is provided with two auxiliary arms 411 that are parallel at edges of both sides of the main arm 41 and extend along the first direction, the two auxiliary arms 411 extend from edges of both sides of the main arm 41 and thus there is a space formed therebetween. The inner sides of the two auxiliary arms 411 are each provided with protruding blocking walls 4111, and two blocking walls 4111 protrude towards each other. The lower boss 43 is extended under the auxiliary arms 411, and the bottom of one end of the two auxiliary arms 411 that is away from the main arm 41 is connected to the beam 45. A third elastic arm 44 provided along the sliding direction of the rod 4 is provided between the two auxiliary arms 411, both ends of the third elastic arm 44 are respectively connected with the end portion of the main arm 41 and the beam 45, the upper surface of the third elastic arm 44 is provided with a protruding structure 440 that includes a second inclined surface 441 and a second straight end surface 442.

Figure 16:
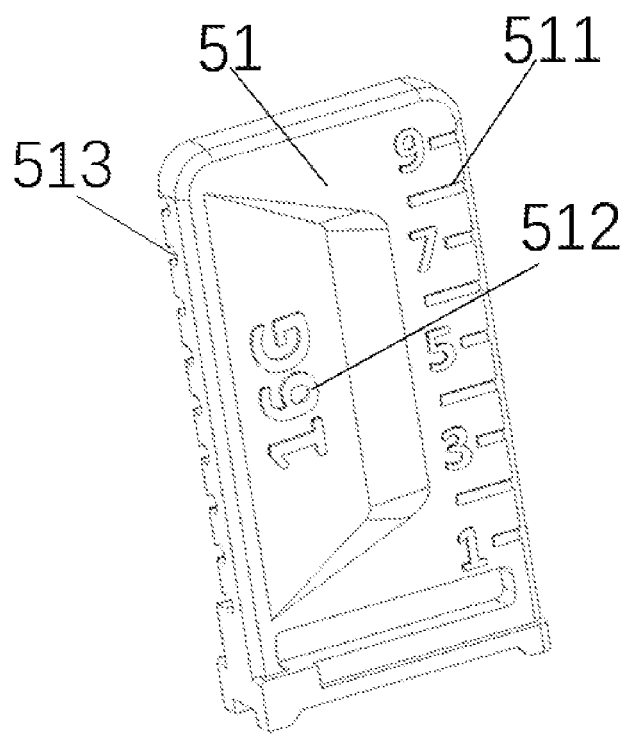
FIG. 16 is a structural schematic diagram of the needle groove plate of a semi-closed needle penetration hole.
Figure 17:
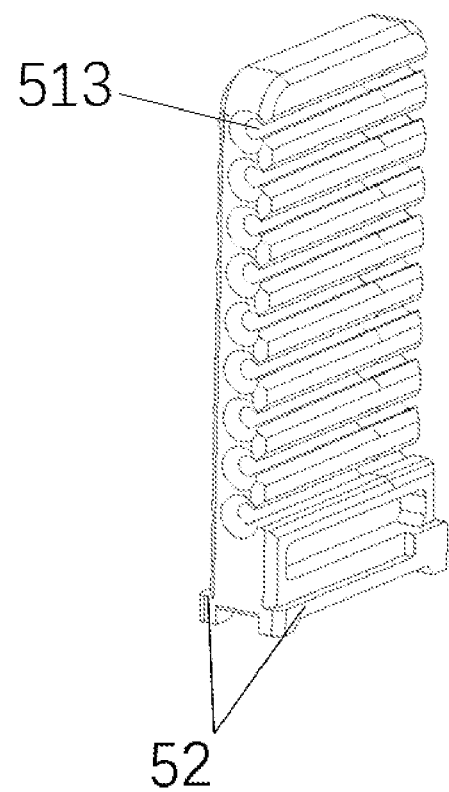
FIG. 17 is a structural schematic diagram of another perspective of Fig, 16.
Figure 18:
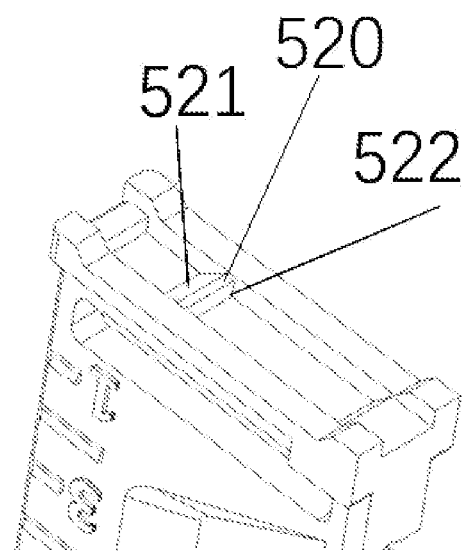
FIG. 18 is a structural schematic diagram of the bottom of the needle groove plate.

FIG. 16 is a structural schematic diagram of a needle groove plate of a semi-closed needle penetration hole, FIG. 17 is a structural schematic diagram of another perspective of FIG. 16, and FIG. 18 is a structural schematic diagram of the bottom of the needle groove plate. As shown in FIGS. 16-18, the needle groove plate 5 includes a needle groove arm 51 and two insertion arms 52, wherein the needle groove arm 51 is provided with a depth identifier 511 and a specification identifier 512, and the two insertion arms 52 are provided at the edge of the bottom of the needle groove arm 51 along the horizontal direction of the needle groove arm 51. The bottom surface of the needle groove arm 51 is provided with a protruding structure 520 located between the two insertion arms 52. The protruding structure 520 includes a third inclined surface 521 and a third straight end surface 522. The insertion arms 52 are inserted between the two auxiliary arms 411, and the upper surfaces of the insertion arms 52 fit the lower surfaces of the blocking walls 4111, the positions of the second inclined surface 441 and the second straight end surface 442, and the third inclined surface 521 and the third straight end surface 522 are so set that the second straight end surface 442 abuts against the third straight end surface 522, and thereby the insertion arms 52 cannot move towards the left (see FIG. 10) and accordingly cannot exit from between the two auxiliary arms 411. On the other hand, the insertion arms 52 are blocked by the upper boss 42 of the main arm 4 when moving towards the right, so that the needle groove plate 5 is fixed to the main arm 4. Besides, as can be seen, the second straight end surface 442 and the third straight end surface 522 that abut against each other cannot be reached from the outside, and thus the abutting state cannot be removed without causing damages, thereby realizing disposable use of medical devices and improving sanitation and safety.

As shown in FIG. 14, both ends of the beam 45 respectively protrude towards the left and the right so as to abut against the end surface of the second end of the hold hoop 11 close to the rod 4 to form a limiting position. The limiting position structure cooperates with the limiting position structure of the end wall 46 of the other end of the rod 4 so that there are both limiting positions at both ends of the rod 4 and the rod 4 cannot be separated from the main body 1. This also helps to realize disposable use of the medical devices.

Figure 19:
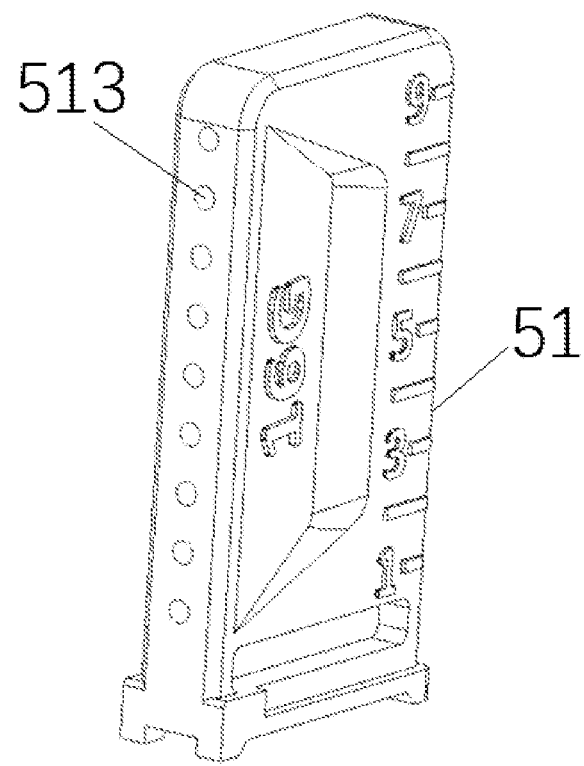
FIG. 19 is a structural schematic diagram of the needle groove plate of a fully-closed needle penetration hole.
Figure 20:
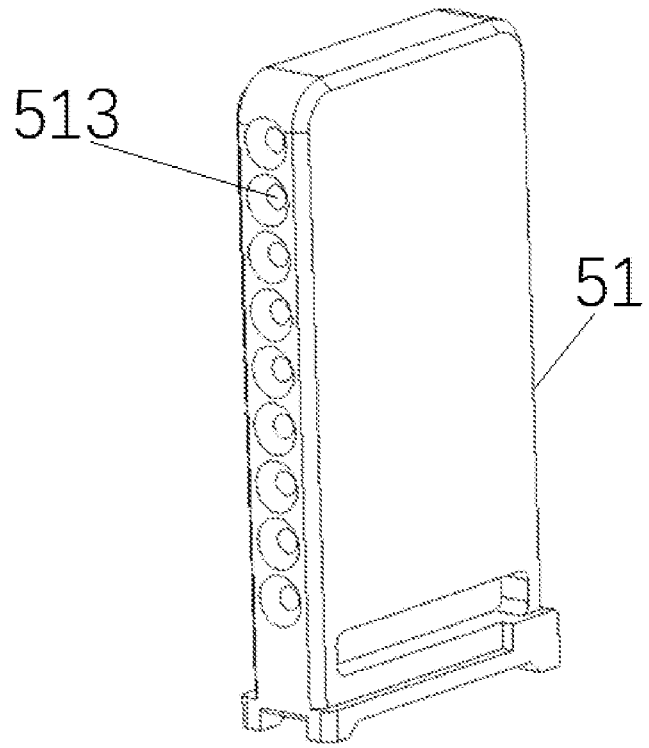
FIG. 20 is a structural schematic diagram of another perspective of Fig.

In embodiments of the present invention, the needle penetration hole 513 is a fully closed hole or a semi-closed hole, wherein, a plurality of beams are provided in parallel on the side wall of the needle groove arm 51 along the vertical direction of the needle groove arm 51, and spacing between the plurality of beams forms a semi-closed hole; or, the needle penetration hole 513 is a hole having a full inner wall and penetrating the needle groove plate 5, and is a fully closed hole. As shown in FIGS. 16 and 17, the needle penetration hole 513 in the needle groove plate 5 is a semi-closed hole. FIG. 19 is a structural schematic diagram of a needle groove plate of a fully closed needle penetration hole. FIG. 20 is a structural schematic diagram of another perspective of FIG. 19. The needle penetration hole 513 in the needle groove plate 5 in FIGS. 19 and 20 is a fully closed hole. The position of the needle penetration hole 513 is in one-to-one correspondence with the position of the depth identifier 511, and conforms to the needle insertion route set by software in an ultrasound machine. The size of the needle penetration hole 513 is in one-to-one correspondence with the specification identifier 512. The model of the needle penetration hole 513 can be selected according to the actual needs, wherein, when the semi-closed hole structure is used, a puncture needle or a biopsy needle can be rapidly moved in parallel out of the opening of the needle penetration hole 513 when the doctor requires the puncture needle to be separated from a puncture needle support, so that the ultrasonic probe and the puncture support can be rapidly removed and the puncture needle can be left alone in the human body for operations such as drug delivery or treatment.

Figure 21:
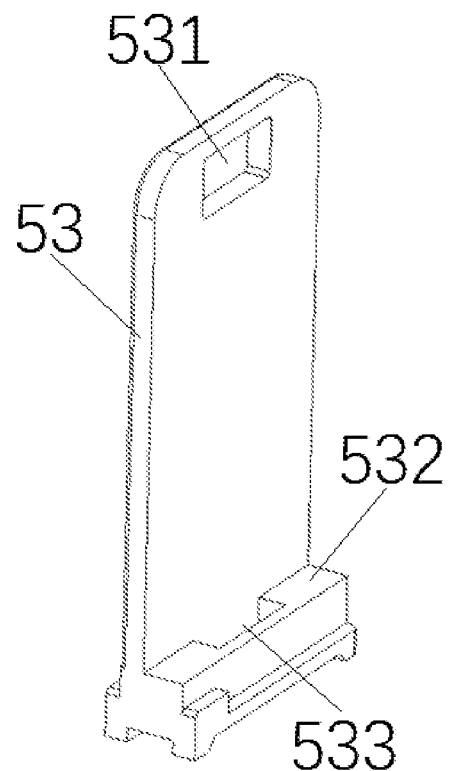
FIG. 21 is a structural schematic diagram of a main body portion.
Figure 22:
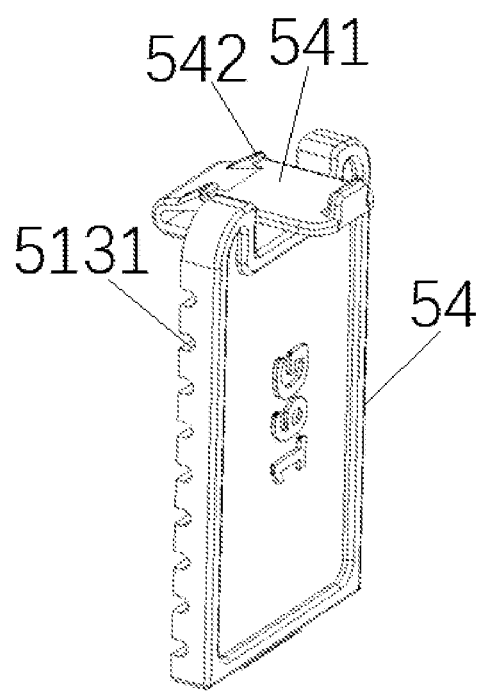
FIG. 22 is a structural schematic diagram of a cooperating portion.
Figure 23:
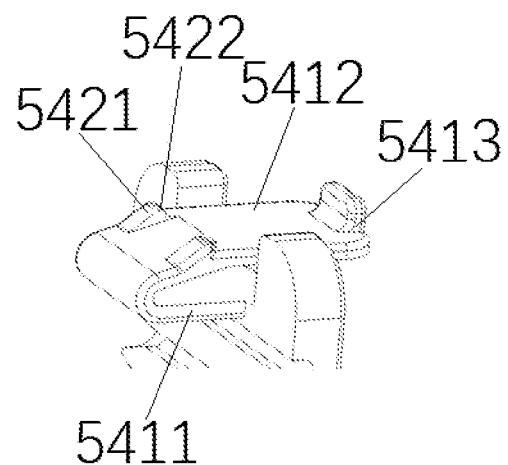
FIG. 23 is a structural schematic diagram of a buckle of the top of the cooperating portion.
Figure 24:
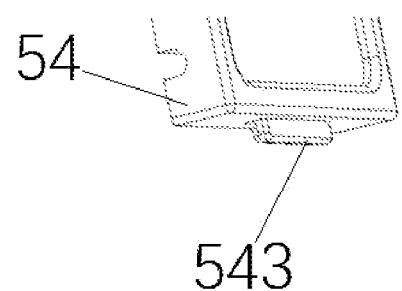
FIG. 24 is a structural schematic diagram of a protrusion of the bottom of the cooperating portion.

Since the needle groove plate 5 is an independent structure, it is only required that the needle groove plate 5 is clamped on the rod 4. Therefore, the needle groove plate 5 may have various structural forms. FIG. 21 is a structural schematic diagram of the main body, FIG. 22 is a structural schematic diagram of the cooperating portion, FIG. 23 is a structural schematic diagram of the buckle of the top of the cooperating portion, and FIG. 24 is a structural schematic diagram of the protrusion in the bottom of the cooperating portion. As shown in FIGS. 21-24, the needle groove plate 5 can further adopt a split structure. That is, the needle groove arm 51 includes a main body portion 53 and a cooperating portion 54, a groove 5131 is provided on an abutting surface of the cooperating portion 54, and an abutting surface of the cooperating portion 53 abuts against the cooperating portion 54 to form a closed hole.

The main body portion 53 and the cooperating portion 54 are connected by a connecting component. The connecting component includes a hole 531 located on the top of the main body portion 53 and a buckle 541 located on the top of the cooperating portion 54, the buckle 541 includes a first board 5411 perpendicular to the abutting surface of the cooperating portion 54, a free end of the first board 5411 is connected with a second board 5412 provided parallel to the first board 5411, the first board 5411 and the second board 5412 form a U-shaped structure, a free end of the second board 5412 extends and protrudes out of the surface of the cooperating portion 54, the extends and protrudes out of surface is a plane away from the abutting surface of the cooperating portion 54, and the upper surface of the second board 5412 is provided with a protruding structure 542 that has a fourth inclined surface 5421 and a fourth straight end surface 5422. The bottom of the main body portion 53 is provided with an abutting platform 532 that abuts against the bottom of the cooperating portion 54, the abutting platform is provided with a groove 533, and the bottom of the cooperating portion 54 is provided with a protrusion 543 to be inserted into the groove 533.

Figure 25:
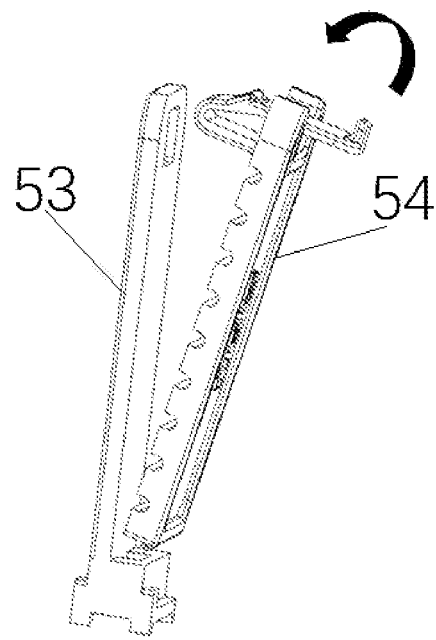
FIG. 25 is a structural schematic diagram when the main body portion and the cooperating portion are assembled.
Figure 26:
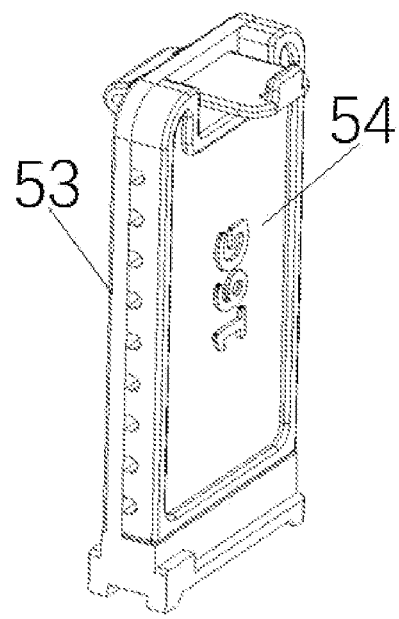
FIG. 26 is a structural schematic diagram after the main body portion and the cooperating portion are assembled.

FIG. 25 is a structural schematic diagram when the main body portion and the cooperating portion are assembled, and FIG. 6 is a structural schematic diagram after the main body portion and the cooperating portion are assembled. As shown in FIG. 25, when the main body portion 53 and the cooperating portion 54 are assembled into a device, firstly the protrusion 543 is inserted into the groove 533, and the central point of the protrusion 543 and the groove 533 moves the cooperating portion 54, so that the abutting surface of the cooperating portion 54 fits the abutting surface of the main body portion 53, wherein, during the movement process, the buckle 541 is inserted into the hole 531, the second board 5412 can be deformed downwards (extrusion deformed or manually pressed deformed), and can automatically reset, so that the protruding structure 542 automatically resets after going through the hole 531, and finally the fourth straight end surface 5422 abuts against the hole 531 to form an assembly structure as shown in FIG. 26. When disassembling is performed, a handle 5413 on the second board 5412 is pressed by hand to deform the second board 5412, then the protruding structure 542 can break away from blocking by the side walls of the periphery of the hole 531 so as to separate the buckle 541 from the hole 531, and finally it is only required that the protrusion 543 in the bottom of the cooperating portion 54 is pulled out from the groove 533.

The needle groove plate 5 adopts a split structure. When the needle groove plate 5 is used, cooperating portions 54 of different models can be assembled with the main body portion 53 to further form needle groove plates 5 of different models to satisfy different usage requirements in biopsy surgery.

The puncture support provided by the embodiment has the following advantages:

1. The hold hoop 11 is adjustable in tightness and can be sleeved on ultrasonic probes of different sizes, and has a high commonality/utility;

2. The needle groove plate can be mounted without a dedicated stepper, thereby saving costs;

3. The sizes of the needle groove plate is reduced, thereby reducing an overall sizes of the puncture support. The needle groove plate will not interfering with the doctor's operations, and can be used with convenience and flexibility;

4. After inserting the head of the ultrasound probe into the patient's rectum, the needle groove plate can tightly fit the patient's perineum. Due to different postures of patients, abutting degrees between the needle groove plate and the perineum are not the same. For example, an obese person needs to fine-tune the needle groove plate backwards. The rod of the puncture support provided by the embodiments of the present invention is telescopically adjustable, so that the puncture support can be adjusted to the best state for use, thereby facilitating use by the doctor and improving surgery quality;

5. A row of puncture holes 513 provided in the needle groove plate 5 drive the puncture support to rotate by rotating the ultrasonic probe, thus a fan-shaped puncture area can be formed, and further a precise puncture of any part of the prostate can be satisfied without a puncture blind spots;

6. Using the semi-closed puncture holes 513 can quickly move puncture needles or biopsy needles in parallel from the opening in the puncture holes 513 when the doctor needs to separate the needle from the support, so that the ultrasonic probe and the puncture support can be quickly removed, and the puncture needle can be left in the human body alone for operations such as drug delivery or treatment.

Figure 27:
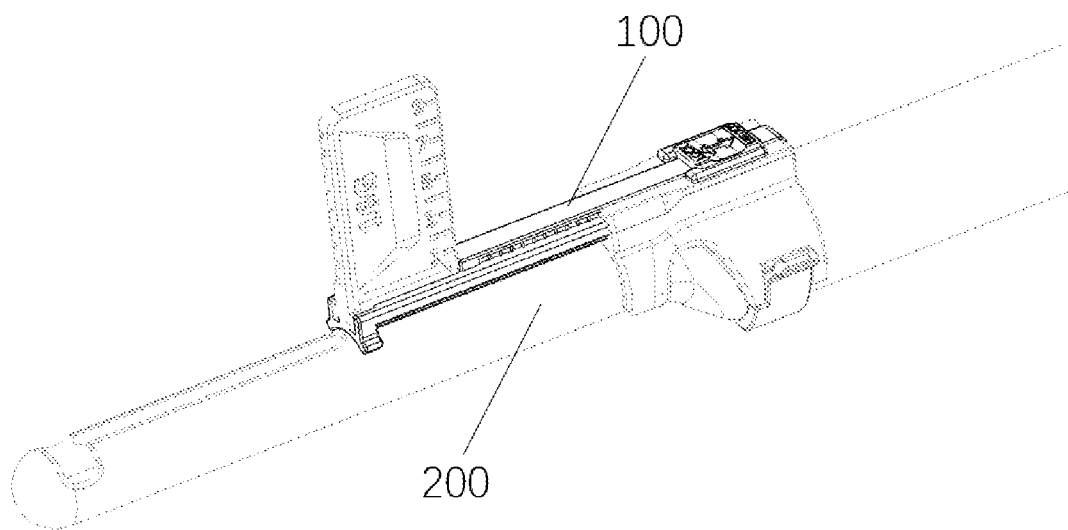
FIG. 27 is a structural schematic diagram of a biopsy device according to an embodiment of the present invention.

Embodiments of the present invention further provide a biopsy device, which includes an ultrasonic probe 200 and a puncture support 100. FIG. 27 is a structural schematic diagram of the biopsy device, and as shown in FIG. 27, the hold hoop 11 of the main body 1 is sleeved on the outer wall of the ultrasonic probe. In order to further improve stability of connection between the puncture support 100 and the ultrasonic probe 200, as shown in FIG. 3, the hold hoop 11 is provided with a slot 113 for clamping the position limit protrusion on the outer wall of the ultrasonic probe. At the same time, the lower surface of the beam 45 abuts against the outer wall of the ultrasonic probe 200, and in order to improve fitting degree between the two, the lower surface of the beam 45 is set as an arch-shaped surface having the same radian as the outer wall of the ultrasonic probe 200.

The specific embodiments do not constitute limitations upon the protection scope of the present invention. A person skilled in the art should understand that, depending on design requirements and other factors, various modifications, mixtures, sub-mixtures and substitutions can be made. Any modification, equivalent substitution, improvement, etc. within the spirits and principles of the present invention shall fall into the protection scope of the present invention.

The invention claimed is:

1. A needle groove plate, comprising a needle groove arm (51) and a clamping component, wherein:
the needle groove arm (51) is provided with a plurality of parallel needle penetration holes (513) arranged along a vertical direction of the needle groove arm (51) and penetrating the needle groove arm (51) along a horizontal direction of the needle groove arm; and
the clamping component is located at a bottom of the needle groove arm (51);
the clamping component comprises a protruding structure (520) and two insertion arms (52), wherein:
the two insertion arms (52) are provided at an edge of the bottom of the needle groove arm (51) along a width direction of the needle groove arm (51);
the protruding structure (520) is provided in the bottom of the needle groove arm (51) and is located between the two insertion arms (52), and the protruding structure (520) comprises a protruding structure inclined surface (521) and a protruding structure straight end surface (522).

2. The needle groove plate according to claim 1, characterized in that, on side walls of the needle groove arm (51), a plurality of beams are provided in parallel along the vertical direction of the needle groove arm (51), and the needle penetration holes (513) are voids between the plurality of beams.

3. The needle groove plate according to claim 2, characterized in that, a width of an entrance into the needle penetration holes (513) from a radial direction of the needle penetration holes (513) is smaller than an inner diameter of the needle penetration holes (513).

4. The needle groove plate according to claim 1, characterized in that, the needle penetration holes (513) each have an intact inner wall.

5. The needle groove plate according to claim 1, characterized in that, the needle groove arm (51) comprises a main body portion (53) and a cooperating portion (54), wherein,
an abutting surface of the cooperating portion (54) is provided with a plurality of parallel grooves (5131) that are arranged along the vertical direction of the needle groove arm (51) and penetrate the needle groove arm along the horizontal direction of the needle groove arm; and
an abutting surface of the main body portion (53) fits the abutting surface of the cooperating portion (54) to form a hole having an intact inner wall.

6. The needle groove plate according to claim 5, characterized in that: the main body portion (53) and the cooperating portion (54) are connected by a connecting component;
the connecting component comprises a hole (531) located in a top of the main body portion (53) and a buckle (541) located in a top of the cooperating portion (54), the buckle (541) comprises a first board (5411) perpendicular to the abutting surface of the cooperating portion, a free end of the first board (5411) is connected with a second board (5412) arranged in parallel with the first board (5411), the first board (5411) and the second board (5412) form a U-shaped structure, a free end of the second board (5412) extends and protrudes out of a surface of the cooperating portion (54), the surface of the cooperating position is a plane away from the abutting surface, and an upper surface of the second board (5412) is provided with a second board protruding structure (542), the second board protruding structure (542) comprises a second board protruding structure inclined surface (5412) and a second board protruding structure straight end surface (5422);
and/or,
a bottom of the main body portion (53) is provided with an abutting platform (532) that abuts against a bottom of the cooperating portion (54), the abutting platform (532) is provided with a groove (533), and the bottom of the cooperating portion (54) is provided with a protrusion (543) to be inserted into the groove (533).

7. The needle groove plate according to claim 1, characterized in that, one end of the insertion arms (52) is an insertion end, and the other end thereof is a position limit end provided with a stop protruding along a surface of the insertion arms (52).

8. A puncture support, characterized by comprising a main body (1), a rod (4), and the needle groove plate (5) according to claim 1, wherein: the main body (1) is connectable with an ultrasonic probe and has a channel (13) whose length is smaller than a length of the rod (4);
the rod (4) can, from a first end thereof, go into the channel (13), and slide back and forth in the channel (13) along a first direction that is parallel to an extending direction of the rod (4); and
the needle groove plate (5) is fixed to a second end of the rod (4).

9. The puncture support according to claim 8, characterized in that, the main body (1) comprises a hold hoop (11) and two L-shaped walls (12) with a space;
the hold hoop (11) is used to connect the ultrasonic probe;
and the L-shaped walls (12) comprise vertical walls (123) and horizontal walls (124), wherein the vertical walls (123) extend from an outer surface of the hold hoop (11) towards a direction away from the hold hoop (11), the two horizontal walls (124) respectively extend from free sides of the two vertical walls (123) inwardly towards each other, and the free sides are parallel to the first direction, so that the two L-shaped walls (12) and an outer wall of the hold hoop (11) form the channel (13).

10. The puncture support according to claim 9, characterized in that,
the hold hoop (11) comprises a hold hoop main body having an arch-shaped cross section and an arch-shaped wrench (2) connected with the hold hoop main body, and the L-shaped walls (12) are located on the hold hoop main body; and
one end of the wrench (2) is rotatably connected next to one edge of the hold hoop main body, and a first stepped edge (111) is located next to a second edge of the hold hoop main body, and a second end of the wrench (2) is provided with a second stepped edge (23) for clamping the first stepped edge (111) so that the hold hoop main body and the wrench (2) form a closed loop.

11. The puncture support according to claim 9, characterized in that, an upper surface of a main arm (41) of the rod (4) comprises an upper boss (42) that protrudes upwards so as to be located between the two horizontal walls (124) and extend along the first direction; and a plurality of pits (421)

are arranged along surfaces of two side walls of the upper boss (42) in one line along the first direction;

the two horizontal walls (124) have notches (122) in a same position in the first direction;

the puncture support further has a push button (3) and two first elastic arms (121), wherein:

a fixed end of the first elastic arms (121) is fixed to an inner wall of an entrance of the notches (122), and the first elastic arms (121) are parallel to the first direction, so that the first elastic arms (121) and the notches (122) form a hole (120), free ends of the two first elastic arms (121) are provided with convex points (1211), and two of the convex points (1211) protrude towards each other;

the push button (3) comprises a push button platform (31) and two fixed arms (32) located on a lower surface of the push button platform (31) and the two fixed arms are perpendicular to the push button platform (31), the fixed arms (32) are inserted into the hole (120) and can slide in the hole (120) along the first direction, roots of the fixed arms (32) have a first section (321) of the fixed arms protruding towards the entrance of the notches (122), the first section (321) of the fixed arms is used for abutting against the free ends of the first elastic arms (121) so that the convex points (1211) get into the pits (421) and thereafter cannot be separated therefrom, thereby limiting the rod (4) sliding in the channel (13) along the first direction.

12. The puncture support according to claim 11, characterized in that:

the first section (321) of the fixed arms is provided with a second section (323) of fixed arms extending towards a direction away from the push button platform (31), a U-shaped groove (322) parallel to the first direction is formed between the second section (323) of the fixed arms and the first section (321) of the fixed arms, and part of edges of both sides of the main arm (41) are located in the U-shaped groove (322); and an upper surface of the push button platform (31) is provided with a hand position slot (311) and/or an identification portion.

13. The puncture support according to claim 9, characterized in that:

a lower portion of the rod (4) has a groove (47) extending along the first direction, and an accommodating space is formed between the groove (47) and an outer wall of the hold hoop (11);

a wall of the hold hoop (11) is provided with a single hole (134) in which a second elastic arm (131) is provided, and the single hole (134) is located on the wall of the hold hoop (11) in the channel (13) and close to one end of the channel (13) away from the needle groove plate (5);

the second elastic arm (131) is parallel to the first direction, a fixed end of a second elastic arm (131) is fixed to an end surface of the wall of the hold hoop (11), and a free end of the second elastic arm (131) is provided with a second elastic arm protruding structure (130) that comprises a first straight end surface (133) whose height is greater than a wall thickness of the hold hoop (11), so that the second elastic arm protruding structure (130) protrudes towards an interior of the channel (13) and goes into the accommodating space; and a first end of the rod (4) has an end wall (46) perpendicular to the first direction, and an inner side (461) of the end wall can be blocked by the first straight end surface (133) during a sliding process of the rod (4) so as to stop sliding.

14. A biopsy device, characterized by comprising an ultrasonic probe and a puncture support according to claim 7;

wherein a hold hoop (11) of the puncture support is sleeved on an outer wall of the ultrasonic probe.

15. The biopsy device according to claim 14, characterized in that, the outer wall of the ultrasonic probe is provided with a position limit protrusion, and the hold hoop (11) is provided with a slot (113) for clamping the position limit protrusion.

* * * * *